March 27, 1934.　　　R. L. TEMPLIN　　　1,952,953
FATIGUE TESTING MACHINE
Filed April 16, 1931　　　3 Sheets-Sheet 1
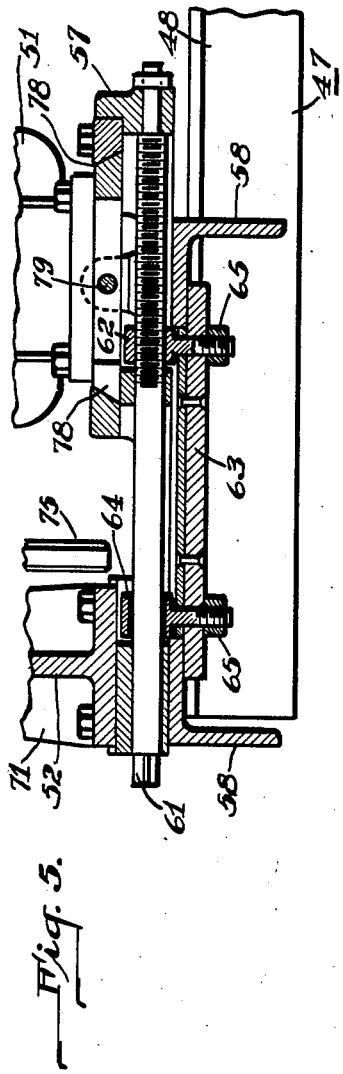
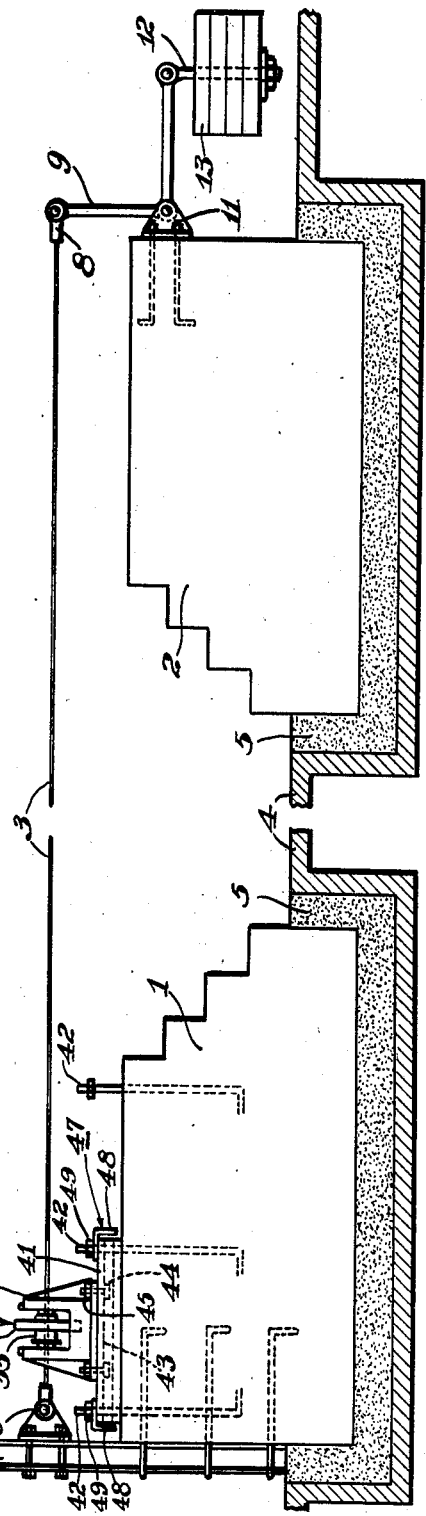
WITNESSES
A. B. Wallace.
W. D. O'Connor
INVENTOR
Richard L. Templin
by Brown & Critchlow
his attorneys

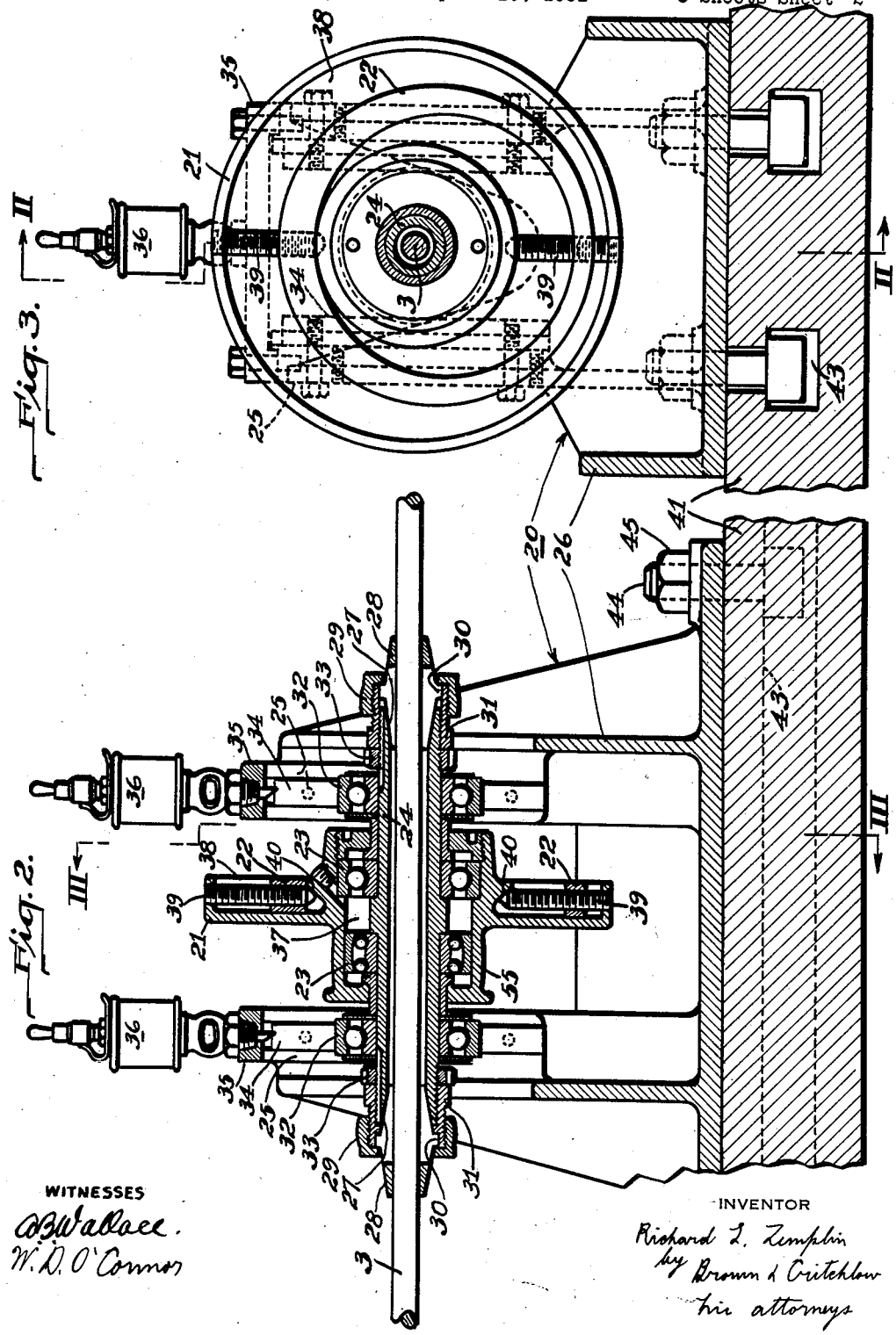

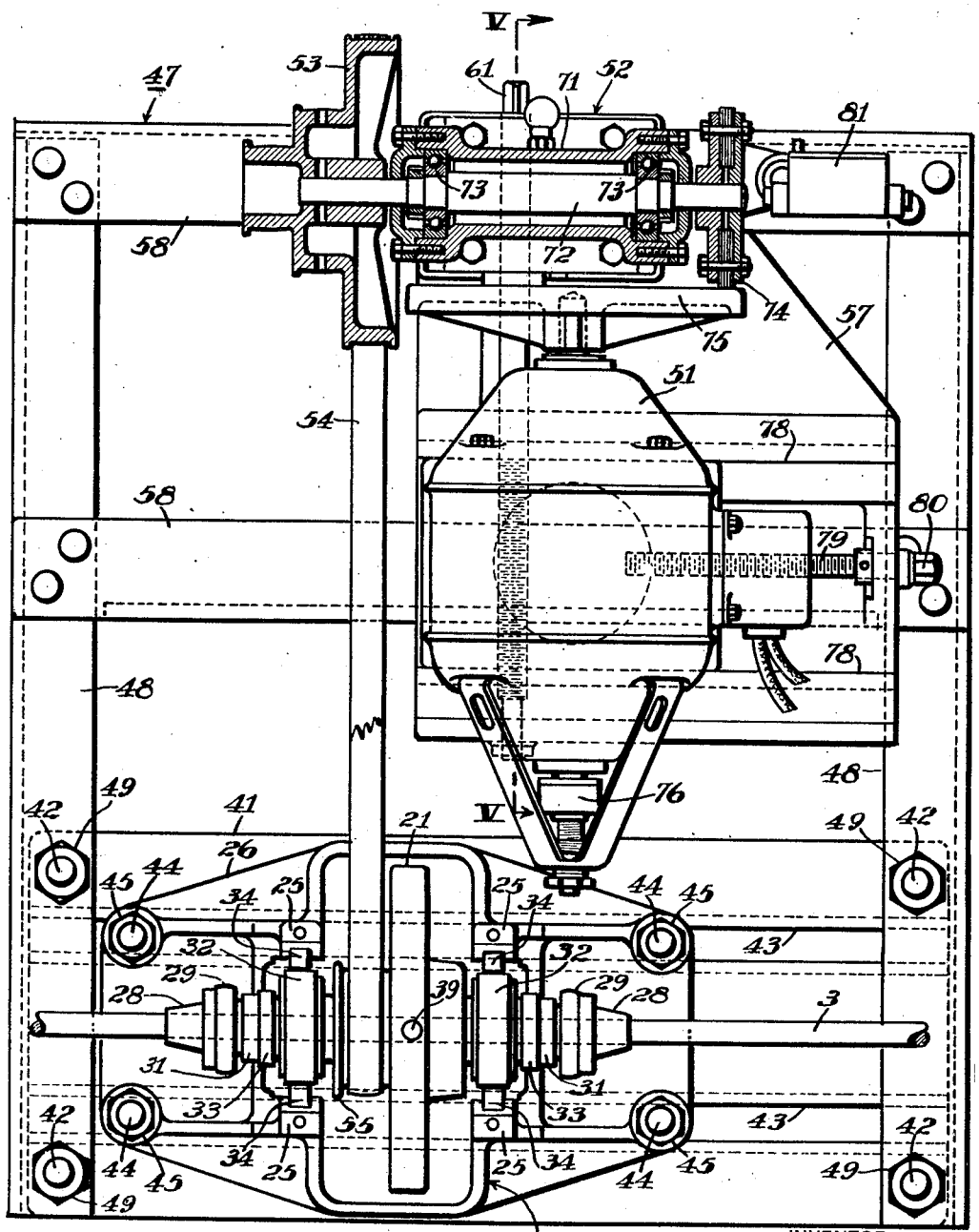

Patented Mar. 27, 1934

1,952,953

UNITED STATES PATENT OFFICE 1,952,953

FATIGUE TESTING MACHINE

Richard L. Templin, Parnassus, Pa., assignor to Aluminum Company of America, Pittsburgh, Pa., a corporation of Pennsylvania Application April 16, 1931, Serial No. 530,495

7 Claims. (Cl. 73—51)

This invention relates generally to the art of testing materials, and particularly to the testing of wires or cables to determine their resistance to stresses set up by periodic forces.

In utilizing wires and cables in long spans as for instance in overhead lines for the transmission of electrical energy, the cables are subjected, in addition to the tensile stresses set up in them in supporting their own weight, to periodic stresses that result from vibrations. These undesirable vibrations are ordinarily set up by the wind or other forces causing the cable to oscillate in the direction transverse to its length. It will be readily appreciated that it is difficult to obtain data regarding the vibrations of cables when they are mounted in their operating positions for the reason that it is inconvenient to make the necessary measurements, and the oscillations cannot be controlled to provide data over a complete range of conditions.

An object of my invention is to provide apparatus for testing cables to determine their resistance to fatigue as the result of repeated stresses. A further object is to provide a cable-testing apparatus capable of duplicating the conditions to which a cable is subjected when supported in a span of a transmission line.

In accordance with this invention, I provide supporting structures to which the ends of a cable to be tested are attached. The supporting structures are mounted, for instance on the floor of a building, in such manner that vibrations will not be transmitted from one structure to the other through the floor of the building, and suitable means are provided for applying predetermined tensile force to the cable. Suitable apparatus is provided, preferably mounted on one of the supporting structures, for causing the cable to vibrate in a direction transverse to its length. This apparatus is mounted intermediate the ends of the cable to cause vibration in a longitudinal plane, and is adjustable to apply a predetermined force at predetermined frequency.

Particular apparatus for accomplishing this result and for achieving the stated and other objects of the invention that will be apparent upon further consideration of this specification is described in detail herein and shown in the accompanying drawings, of which Fig. 1 is a more or less diagrammatic view in elevation of the cable-testing apparatus; Fig. 2 is a view in longitudinal section taken on the plane represented by the line II—II in Fig. 3, of the mechanism for causing the cable to vibrate; Fig. 3 is a view, partly in end elevation and partly in section, of the cable-vibrating mechanism taken on the plane represented by the line III—III of Fig. 2; Fig. 4 is a plan view, partly in horizontal section, of the cable-vibrating mechanism and its associated operating mechanism; and Fig. 5 is a view in cross section of the operating mechanism taken on the plane represented by the line V—V in Fig. 4.

Referring more particularly to the general view of the cable-testing mechanism in Fig. 1, the apparatus comprises two piers 1 and 2 for supporting, at its respective ends, a piece of wire or cable 3 to be tested. The supporting piers 1 and 2 are preferably massive bodies of concrete or of other suitable material, supported on the floor 4 of a building by means of seals or pads 5 of non-resonant material, as for instance sand, to prevent extraneous vibrations from being transmitted from the floor 4 to the cable 3 by way of the piers, hence preventing transmission of vibrations through the floor from one end of the cable to the other. The piers may be spaced as desired to provide for receiving a piece of cable of suitable length for testing.

As shown, one end of cable 3 is rigidly secured to the pier 1 by means of any suitable anchor or cable clamp 6 attached at the rear edge of the pier 1 and elevated somewhat above its upper surface by means of a supporting structure 7 that may be made of I-beams or other structural elements. To enable predetermined tensile stresses to be set up in the cable 3, for duplicating the tensile stresses that occur in transmission-line cables, the other end of the cable is supported on pier 2 by means of an anchor 8 connected to one arm of a bell crank 9, pivoted on a bracket 11 at the back of the pier, on the other arm of which is suspended a weight 12. The effect of the weight 12 in applying tension to the cable may be changed by adding to or taking from it disks 13, as is ordinarily done in adjusting the weights on a scale, or by providing any other convenient means for applying objects of known weight.

Mounted on pier 1 is a mechanism 20 for impressing upon the cable 3 periodic forces that set it to vibrating in such manner as to duplicate the vibrations of a cable constituting part of a transmission line. Such vibrations in a suspended cable may be caused by the wind, snow or ice loads, or by other forces to which the transmission line may be subjected. As is well known, vibrations set up stresses within the material of the cable of a repeating nature that add to the initial tensile stress in the cable, and periodically raise the total stress to dangerously high values. It is also well known that, when subjected to repeated stresses of this nature, material may fracture progressively and ultimately fail altogether from what is termed fatigue.

To enable a careful study to be made of the effects of repeated stresses on a suspended cable, it is desirable that the conditions under which the test cable 3 is caused to vibrate be readily predetermined and controlled. To accomplish such control, the vibrating mechanism 20 is designed to apply to the cable 3 transverse vibrations in one longitudinal plane of the cable, of predetermined amplitude and frequency. This apparatus comprises essentially a fly wheel 21, journalled to rotate around the cable 3 as a center, in a plane transverse to the cable. To effect vibration of the cable 3, the fly wheel 21 is provided with an eccentrically mounted weight 22 which may be adjusted, relative to the center of rotation, to regulate the applied force and amplitude of vibration of the cable. To adjust the frequency of vibration, it is simply necessary to regulate the speed of rotation of the fly wheel.

As shown in detail in Fig. 2, the fly wheel 21 is journalled for rotation by means of suitable ball-bearings 23 on a substantially cylindrical sleeve or spindle that surrounds and is secured to the test cable 3. The ends of the sleeve 24 are disposed between pairs of vertical guides or standards 25 that constitute part of a frame 26 for the vibrating mechanism. The vertical guides 25 constrain the sleeve 24, and consequently the cable 3, to motion in the vertical longitudinal plane of the cable. For locking the sleeve 24 securely to the test cable 3, the sleeve is provided at each end with a conical bore 27, into which is fitted a complementally-shaped split collet 28. The collets 28 may be forced into the conical bores 27 by means of retaining nuts 29, each of which engages a shoulder 30 on the periphery of the cooperating collet 28. The retaining nuts 29 are provided with internal threads that engage complementary threads on sleeves 31 that are in turn threaded on the exterior of the spindle 24. In accordance with well-known clamping action, as the retaining nuts 29 are turned onto the sleeves 24, the fingers or segments of collets 28 will be forced towards each other by the conical bores 27, and thus tightly grip the cables 3 in such manner that the spindle 24 becomes rigidly attached to it. To release the spindle 24 from the cable 3 after a test has been completed, the sleeves 31 may be unscrewed from the ends of the spindle, whereupon they engage the shoulders 30 and force the collets 28 out of conical bores 27.

Near each end, the sleeve 24 is provided with encircling ball-bearings 32 held in place on the sleeve by lock nuts 33, the outer races of said ball-bearings fitting between the guide plates or bearings 34 mounted on the guides 25 provided on the frame 26.

To retain the sleeve 24 within the guides 25 and to strengthen the frame structure, the tops of the guides 25 in each pair are connected by a tie bar 35, near the middle of each of which there is an oil cup 36 from which oil is permitted to drip on the ball-bearings 32 to lubricate them and the guide plates 34. Such excess oil as may drip from the bearings is collected in the base of the frame 26.

A suitable chamber 37 is provided within the fly wheel 21 for receiving lubricant, such as grease, for lubricating the ball-bearings 23 that support the fly wheel on the spindle 24. As best shown in Fig. 3, the eccentric weight 22 is in the shape of an annulus that encircles the hub of the fly wheel 21 and lies within a chamber 38 in one side of the wheel between the hub and the rim thereof. The eccentric loading ring 22 is supported in the chamber 38 by means of two set screws 39 which pass through diametrically opposed openings in the rim of the wheel 21 and are threaded in similarly aligned openings through the ring 22 in such manner that the screws 39 lie on a diameter of the wheel 21. As shown, the inner ends of the screws 39 contact with the hub of the wheel 21, and, in order to adjust the position of the eccentric ring 22, it is merely necessary to loosen one of the screws and tighten the other screw to move the ring in the desired direction. To insure that the ring 22 will be held firmly in its adjusted position, the inner ends of the screws are made conical and bear at one side upon a conical surface 40 on the hub of the wheel 21 in such manner that when the screws are tightened they will tend to force the ring 22 sidewise into frictional engagement with the web of the fly wheel 21. In this manner the ring 22 will be prevented from moving relative to the fly wheel 21 while the vibrating mechanism is in operation.

In order that the maximum range of adjustment may be had, the ring 22 is made with one side thicker than the other, as shown in Fig. 3, and so proportioned that when the thick or heavy side of the ring is adjacent to the hub of the wheel 21, as shown, the wheel 21 will be substantially in true running balance. As the ring 22 is moved from this position to its other extreme position, the degree of unbalance of the wheel is varied from zero to a maximum value. Hence by adjusting the position of the ring any desired degree of periodic force may be applied to the cable 3 within the limits of the apparatus.

The vibrating mechanism 20 is mounted on the pier 1 in such manner that it may be moved longitudinally thereof to position it relative to the fixed end of the cable. As shown in Figs. 1 and 4, the frame 26 of the vibrating mechanism is secured to a base plate 41 that is in turn fastened on the upper surface of the pier 1 by anchor bolts 42. As shown in Fig. 1, a plurality of bolts 42 are provided so spaced that the base plate 41 may be disposed in either one of two positions on the pier at different distances from the end of the cable. This is accomplished by using three equally spaced pairs, or a total of six anchor bolts, and positioning the base plate to engage one pair of bolts at each of its ends. Thus the base plate 41 may engage, at the appropriate end, one of the other end pair of bolts and at its other end, the middle pair of bolts.

For accomplishing closer adjustment of the vibrating mechanism relative to the end of the cable, the base plate 41 is provided with T-slots 43 extending longitudinally thereof and parallel to the cable 3. By means of bolts 44 having square heads disposed in the T-slots 43, the vibrating mechanism is mounted on the base plate 41 in such manner that it may be adjusted longitudinally to any position within the limits of the base plate. After being positioned it may be securely clamped in place by means of nuts 45 threaded on the upper ends of the bolts 44.

For rotating the fly wheel 21 of the vibrating mechanism, a power transmission mechanism is supported adjacent thereto on a suitable frame 47 that comprises two transverse angle elements 48 secured to the ends of the base plate 41 by means of nuts 49 threaded on the ends of the anchor bolts 42, in such manner that the frame overhangs the pier 1. The transmission mechanism comprises a suitable electric motor 51 connected to drive the vibrating mechanism by means of a suitable speed changing device 52 that turns a cone pulley 53 from one face of which a belt 54 extends, in substantially horizontal direction, to a belt pulley 55 on the hub of the fly wheel 21.

As shown in Figs. 4 and 5, the variable speed mechanism 52 and the driving motor 51 are both mounted on a common bed plate 57 that is secured to a pair of longitudinal members 58 extending between the transverse members 48 of the frame 47. The entire bed plate 57, together with the motor 51 and the transmission mechanism 52, may be moved along the longitudinal members 58 of the frame 47 to bring any one of the three faces of the cone pulley 53 into alignment with the belt pulley 55 on the fly wheel of the vibrating mechanism.

After the belt pulleys have been thus aligned and the belt 54 placed in position, the belt may be tightened by moving the entire driving mechanism and its bed plate 57 in the direction away from the vibrating mechanism. This is accomplished by means of a well known adjusting screw 61 that is journalled in the bed plate 57 and has screw threaded engagement with an adjusting block 62 carried by a clamping plate 63 fitted between the longitudinal members 58. As shown, the adjusting block 62 is disposed adjacent one of the longitudinal members 58, and there is provided adjacent the other longitudinal member a similarly shaped clamping block 64. The blocks 62 and 64 are each provided with downwardly extending threaded shanks passing through the clamping plate 63 and provided at their lower ends with clamping nuts 65. After the bed plate 57 has been adjusted to align the belt pulleys, and the belt has been tightened by turning the adjusting screw 61, the entire transmission mechanism may be securely clamped to the frame 47 by tightening the clamping nuts 65 on the adjusting block 62 and the clamping block 64 to draw the clamping plate 63 into firm engagement with the longitudinal members 58, and to prevent further rotation of the adjusting screw 61.

The variable speed-transmission mechanism 52 is of the friction type, comprising a frame 71 in which a shaft 72 is journalled on anti-friction bearings 73 at right angles to the shaft of the motor 51. The cone pulley 53 is mounted on one end of the shaft, and at the other end is mounted a friction wheel 74 driven in a well known manner by a friction disk 75 carried on the shaft of the driving motor 51. To urge the disk 75 into contact with the wheel 74, the motor shaft is provided, at its other end, with an adjustable thrust bearing mechanism 76. To adjust the speed at which the fly wheel 21 is operated, it is merely necessary to move the driving motor 51 relative to the friction wheel 74 to cause the wheel 74 to bear on the friction disk 75 at a position having a different radius of rotation. This adjustment is accomplished by moving the motor 51 in guideways 78 on the base plate 57 in such manner that it may be moved parallel to the shaft 72 on which the friction wheel 74 is mounted. The motor may be adjusted to the desired position along the guideways 78 by means of a screw-thread adjusting mechanism 79 that may be operated by means of a hexagonal fitting 80 at the end of the shaft.

In performing a testing operation, a sample of the cable to be tested is passed through the sleeve 24 of the vibrating mechanism 20 and suspended between the piers 1 and 2 in the manner described. Initial tension is applied to the cable 3 by attaching the required amount of weights 13 to the bell-crank 9, and the eccentric weight 22 is adjusted to exert the desired amount of force to vibrate the cable. The frequency at which the force is to be applied is then regulated by adjusting the variable speed mechanism 52. The apparatus may then be operated until the cable 3 breaks from fatigue failure, or if the cable does not fail, the test may be continued for a predetermined number of reversals of stress in the cable. The total number of reversals of stress imposed upon the cable 3 during a test may be recorded by means of a revolution counter 81 mounted on the transmission mechanism 52 and actuated by the shaft 72.

Although I have shown and described only one specific embodiment of my invention, it is self evident that the apparatus for practicing the invention may be constructed in many other ways, and it is to be understood that the specific terms used in describing the various parts of the apparatus are for the purpose only of clearly disclosing a workable embodiment of the invention and are not to be interpreted as limiting the spirit and scope of the invention as defined in the appended claims.

I claim:

1. A cable testing apparatus comprising spaced supporting structures for supporting at its ends a cable to be tested, said supporting structures including non-resonant bases to isolate the same from each other and their surroundings, means for applying a tensional force to said cable, and means for imparting vibrations to the cable in a direction transverse to its length, said vibration-imparting means comprising an eccentrically-loaded fly wheel mounted for rotation upon and positioned intermediate the ends of said cable.

2. A cable testing apparatus comprising a pair of isolated supports, means for suspending a cable to be tested between said isolated supports, means for gripping said cable intermediate the supports, and means to actuate said gripping means to impart vibrations to the cable in a direction transverse to its length, said gripping means being mounted for longitudinal movement with respect to the ends of said cable.

3. A cable testing apparatus comprising spaced supporting structures for supporting at its ends a cable to be tested, a sleeve mounted on said cable in spaced relation to one end thereof, vertical guides disposed at each side of said sleeve, a fly wheel having an adjustable eccentric weight rotatably mounted on said sleeve and means for rotating the eccentrically-weighted fly wheel whereby the cable is vibrated in a vertical longitudinal plane.

4. In a cable testing mechanism, a cable-vibrating device adapted to be positioned intermediate the ends of a suspended cable, said device comprising a sleeve secured to said cable, a fly wheel rotatably mounted on said sleeve, and means for driving said fly wheel, said driving means comprising a motor-driven adjustable speed transmission whereby the frequency of vibration may be varied.

5. A cable testing apparatus comprising means for suspending a cable to be tested, said means comprising massive supporting piers arranged in spaced relationship upon non-resonant bases, a cable clamp mounted on one of said piers, a bell crank pivotally mounted on said other pier, said cable having one end attached to the cable clamp and its opposite end attached to one arm of the bell crank, means for loading the other arm of the bell crank to produce a tensional force in said cable, a cable-vibrating mechanism mounted upon one of said piers in engagement with said cable, said vibrating mechanism comprising an eccentrically-loaded fly wheel, and means for rotating said fly wheel at various speeds, said fly wheel being adjustable with respect to its eccentric loading.

6. In apparatus for testing a cable supported at its ends, in combination, a sleeve carried by the cable, means at each end of the sleeve for rigidly securing it to the cable, antifriction bearings carried by the sleeve adjacent to each and thereof, a frame having vertical guide members for engaging said bearings to confine the sleeve to motion in a vertical plane, antifriction bearings on the sleeve at its mid-portion, a fly wheel mounted concentrically with the sleeve and journalled for rotation on the antifriction bearings, an eccentric loading ring carried by the fly wheel, means on the fly wheel for adjusting the position of the loading ring to move the center of gravity of the fly wheel, and means for rotating the fly wheel to cause the cable to vibrate in the plane of the guide members at a frequency equal to the speed of rotation of the fly wheel and with an amplitude proportional to the distance that the center of gravity of the fly wheel is displaced from its centers of rotation.

7. A fatigue testing machine, comprising a fly wheel mounted for rotation and oscillation, a movable weight carried by the fly wheel for causing it to oscillate, said weight being of annular shape and disposed adjacent the web of the fly wheel, set screws having conical inner ends for moving the weight radially within the fly wheel, and a hub portion having a conical face for engaging the conical ends of the set screws so positioned that when the set screws are tightened the annular weight is forced into frictional engagement with the web of the fly wheel.

RICHARD L. TEMPLIN.